Figure 1:
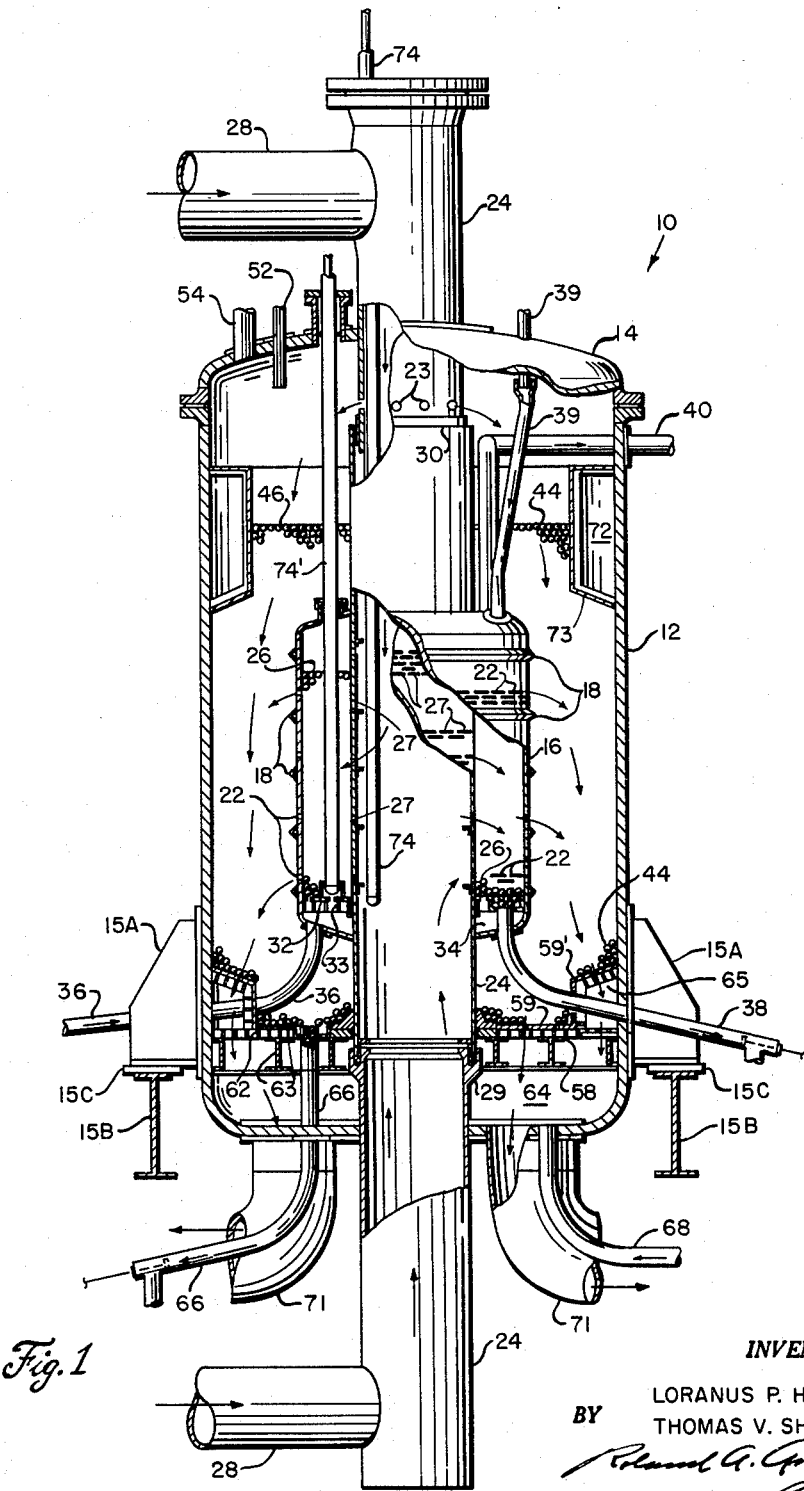

July 7, 1964 L. P. HATCH ETAL 3,140,235
DOWNFLOW PACKED BED NUCLEAR FISSION REACTOR
Filed Nov. 23, 1962 2 Sheets-Sheet 1

INVENTORS.
LORANUS P. HATCH
THOMAS V. SHEEHAN
BY

INVENTORS.
LORANUS P. HATCH
THOMAS V. SHEEHAN

United States Patent Office 3,140,235
Patented July 7, 1964

3,140,235
DOWNFLOW PACKED BED NUCLEAR
FISSION REACTOR
Loranus P. Hatch, Brookhaven, and Thomas V. Sheehan, Hampton Bays, N.Y., assignors to the United States of America as represented by the United States Atomic Energy Commission
Filed Nov. 23, 1962, Ser. No. 239,849
8 Claims. (Cl. 176—18)

This invention relates to a settled pebble bed nuclear fission reactor and more particularly to a settled bed neutron reactor utilizing fluidization techniques for redistributing and changing the fuel.

One of the principal advantages of a nuclear reactor in which a settled bed of relatively small fuel particles is utilized is the uniform distribution and density of the fuel obtained throughout the core. Another important advantage is that the use of such particles eliminates excessive fabrication costs commonly associated with the manufacture of solid fuel elements. Furthermore, there is an excellent possibility that the fuel can be used to a very high degree of burn-up. Due to the closely packed nature of the fuel in a settled pebble bed reactor, a reduced size of fuel inventory can be used to obtain criticality. At the same time, this reactor avoids a major problem of the circulated liquid fuel reactor by confining the fuel to the core and avoiding special apparatus to circulate highly radioactive materials.

In previous reactors packed as a pebble bed, periodic shut-downs are required to remove fuel particles to replace the core with a new supply of fuel. This involves not only a substantial period of time, but also in some cases the scrapping of fuel after low burnup. In addition, many of the particles in the core become agglomerated because of the high temperatures and the close contact which occur over an extended period of time. And because of the aforementioned, difficulty is involved in replacing or rotating small portions of the fuel in the bed, a large excess of reactivity may be required to lengthen the time interval between times necessary to replace the whole inventory of fuel particles at one time. This excess reactivity constitutes an increased hazard and requires compensatingly large control rod equipments.

The present invention overcomes many of the disadvantages generally associated with settled bed nuclear reactors while at the same time retaining the existing settled bed advantages and obtaining other additional advantages. For example, in a preferred embodiment, the fuel particles are arranged in a settled bed configuration utilizing sodium as the coolant to withdraw directly the heat of the fission reaction. In order to rearrange, or to withdraw and substitute fuel particles, the flow of the sodium through the reactor is changed to such a direction as to fluidize the fuel particles. In doing so, it becomes possible and convenient to rearrange the fuel particles within the core and also to withdraw some fuel and replace with fresh particles. As a result, only short shut-down periods are required to maintain throughout the operation of the reactor the uniform distribution of the fuel and therefore the fuel density throughout the entire core. In addition, there is an additional advantage that during fluidization, fuel is able to flow freely through tubes connecting the reactor core region with outside vessels for fuel make-up and removal. Thus, by merely adjusting the pressures in the fluidized liquid stream, convenient and efficient transfer of fuel into and out of the reactor is possible.

Provision for fuel make-up at frequent intervals in accordance with this invention is in itself an important advantage since only small amounts of excess reactivity are then required. This is especially important in a fast reactor of the type herein described as preferred embodiments. Another advantage is the very high and uniform burn-up of the fuel obtainable due to its mobility.

In accordance with one preferred embodiment of this invention, the reactor core consisting of the settled bed of fuel particles is annular in shape and surrounds a central pipe which delivers the molten sodium coolant. The latter travels radially through the bed to withdraw the heat of fission with a minimum of pressure loss. In the upper portions of the core the sodium flow is made to have a downward component to prevent lifting of the bed in these regions during normal operation. Sodium lines are provided to alter, when desired, the pattern of sodium flow to establish upflow and consequent fluidization of the bed, and as a result of the lower pressure loss due to the radial configuration, economies in pumping power are realized.

It is hence a first object of this invention to provide a nuclear reactor having a settled bed of fuel particles during normal operation thereof.

Another object is provision of a settled bed reactor in which the coolant is caused to change its direction of flow to fluidize the bed for rearranging the fuel particles or withdrawing and replacing fuel.

A very important object of this invention is a reactor having very easily moved fuel which however in normal operation is so firmly fixed in place as to prevent reactivity changes due to motion of the fuel bed.

Anther object is to use particulate fuel in such a manner that in normal operation the particles do not move and hence do not suffer wear, attrition, or breakage.

Figure 2:
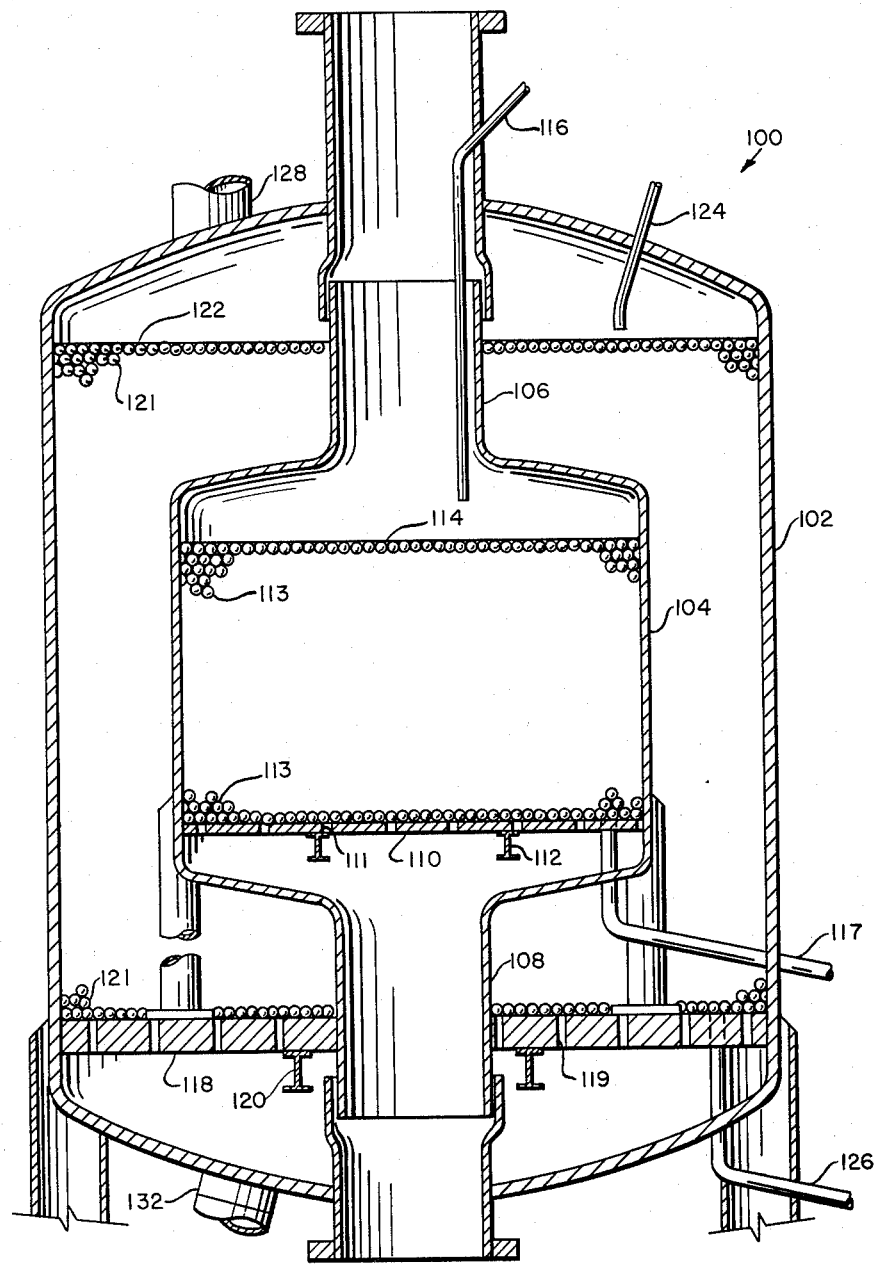

Other objects or advantages of this invention will become more evident from a description of preferred embodiments as illustrated in the accompanying drawings in which:

FIG. 1 is an elevation view in section of a preferred embodiment of this invention; and FIG. 2 is a partially schematic elevation view in section of an alternate embodiment of this invention.

Referring to FIG. 1, there is shown a nuclear fission reactor 10, which may be described as a radial flow, sodium cooled, fast breeder reactor incorporating the principles of this invention. Reactor 10 consists of a cylindrical pressure vessel 12 closed at the bottom and provided with a removable closure 14 at the top. Vessel 12 is supported by brackets 15a, beams 15b, and plates 15c. Within vessel 12 is located a cylindrical core vessel 16 provided with circumferential stiffener rings 18 and perforations 22 for a purpose to be later more particularly described. Extending axially through vessels 12 and 16 is a coolant manifold 24 which thus forms within core vessel 16 a fully enclosed annular space as illustrated which is filled almost completely with fuel particles 26. Manifold 24 is provided above and below vessel 12 with one or more intake conduits 28 for the coolant, a slip seal 29, and a slip joint 30 to accommdate thermal expansions. Within core vessel 16, manifold 24 has some of its perforations 27 terminating above the level of fuel particles 26 as shown to permit the coolant to pass radially out and through fuel particles 26 with a generally downward component. Perforations 22 lining the outer wall of core vessel 16 permit the coolant such as sodium to continue its radial flow. The top row of perforations 22 is below the upper surface of fuel particles 26 to maintain the downward movement of the coolant while a plurality of openings 23 in manifold 24 above joint 30 performs a function to be later described.

A perforated plate 32 supported by structural members 33 within core vessel 16 supports the bed of fuel particles 26 and forms the upper boundary of an annular plenum 34 underneath the bed of particles 26. Several core fluidizing inlet pipes 36 extend as shown from outside reactor 10 into plenum 34 while core unloading tubes 38 extend from above plate 32 in a similar manner out from core vessel 16 for draining out or unloading the bed of fuel particles 26 when desired.

A core loading conduit 39 extends through closure 14 into core vessel 16 for loading the latter with fuel particles 26 while several core fluidizing liquid outlet pipes 40 extend from the top of core vessel 16 out through vessel 12.

Core vessel 16 forms the inner boundary of an annular chamber within pressure vessel 12 for containing blanket particles 44 which fill vessel 12 to a level 46. Terminating in vessel 12 through closure 14 are a blanket loading conduit 52 and blanket fluidizing outlets 54.

A grate structure 58 consisting of a perforated plate 59 reinforced by members 62 and 63 supports blanket particles 44 within vessel 12, and forms a plenum 64 with the closed bottom of vessel 12. Sections 59' of plate 59 form an annular void 65 for a purpose to be later described.

A blanket unloading conduit 66 extends up into vessel 12 and through plate 59 to permit blanket particles 44 to be dumped out when desired. Several blanket fluidizing inlet pipes 68 extend through vessel 12 into plenum 64 for a purpose to be later described. Several coolant outlet manifolds 71 extend from plenum 64 out through pressure vessel 12 to withdraw the coolant entering through conduits 28.

An annular void 72 is formed by an annular structure 73 along the inside of vessel 12 at the upper level of the blanket elements 44. Several control rod thimbles 74 extend through the top closure of manifold 24 along the inner surface of the wall thereof. Into thimbles 74, control rods (not shown) may be driven for control of the reactor as is understood in the art. If desired, or in addition, control rods may also extend directly into the bed of fuel particles as shown in phantom by location of thimbles 74'. Annular voids 65 and 72 provide an approximately constant cross section area throughout the blanket region, permitting a better degree of fluidization.

As is understood in the art, fuel particles 26 would contain a fissionable material to carry out the nuclear reaction required. Blanket particles 44 would contain a fertile material to absorb fast neutron and thereby be converted to a fissionable material. More details of the fuel and blanket particles will be given below.

In the operation of reactor 10, fuel particles 26 and blanket particles 44 normally function as settled beds. Molten sodium enters manifold 24 through inlet conduits 28 filling the former, and flows outwardly through perforations 27. The sodium continues its outward flow through vessel 16, leaving the latter through perforations 22. It will be seen that some of the sodium leaves manifolds 24 through the perforations 27 situated above the level of the settled bed of particles 26 and hence always flows downwardly through the top layer of particles 26. This insures that the top portion of the bed will not shift around or become fluidized in normal operation. Some of the molten sodium also leaves manifold 24 through openings 23 directly into the blanket region of reactor 10 above the level of blanket particles 44, likewise to insure non-fluidization during normal operation. Most of the sodium, however, enters the blanket region through perforations 22 in vessel 16. The sodium travels downwardly in the blanket region and leaves vessel 12 through outlet conduits 71.

At regular intervals the fuel and blanket particles are shifted around as a precaution against agglomeration of particles and to obtain uniform burn-up or breeding throughout the beds. This is accomplished in reactor 10 by fluidizing the particles making up the beds. For core vessel 16, molten sodium is pumped up through fluidizing inlet pipes 36 into plenum 34 and up through plate 32 with sufficient velocity to expand the bed and cause over all circulation as understood in the art. The sodium leaves vessel 16 through outlets 40. In a similar manner the blanket bed of particles 44 is fluidized by sodium being pumped in through conduits 68 into plenum 64, through grate 58 and out the top of vessel 12 through outlets 54.

If desired to replace a smaller portion of each bed at periodic intervals instead of replacing the entire beds at one time, the fluidizing molten sodium may be pumped through at a sufficient velocity to discharge a portion of each bed, or a small portion or all of each bed may be removed through dumping ports 38 and 66, the particles being replaced by fresh ones through loading ports 39 and 52. If it is desired merely to redistribute the particles for uniform burn-up the sodium will be pumped through at just sufficient velocity to fluidize the beds and not to force the particles out the top exits provided. Circulation of the particles within the beds during fluidization redistributes the particles.

Details of the reactor of the type just described are given in Table I.

A modified form of this invention in which the coolant flows axially through the reactor is illustrated somewhat schematically in FIG. 2. Reactor 100 consists of a cylindrical pressure vessel 102 closed top and bottom containing a core vessel 104 with upper and lower pipes 106 and 108, respectively. A plate 110 having perforations 111 and supported by beams 112 holds the bed of fuel particles 113 with the level of the latter being at 114. Ports 116 and 117 into vessel 104 permit fuel loading and unloading.

In the blanket region of reactor 100, a grate structure 118 with openings 119 and supported by beams 120 hold blanket elements 121 with a level at 122. Ports 124 and 126 permit loading and unloading of blanket particles 121. A pair of pipes 128 and 132 provide for coolant in and out of the blanket region.

*Table I*

| | |
|---|---|
| Thermal power (core) | 824 mw. |
| Blanket power (7% of core) | 59 mw. |
| Net electrical power output | 359 mw. |
| Neutron spectrum | Fast. |
| Coolant material | Sodium. |
| Fuel: | |
|    Material | UC–PuC. |
|    Form | 0.122-in. spheres. |
| Blanket: | |
|    Material | UC. |
|    Form | 0.125-in. spheres. |
| Reactor vessel: | |
|    Design pressure | 200 p.s.i. |
|    Design temp | 1200° F. |
|    O.D. | 6.93 ft. |
|    Over-all height | 13.75 ft. |
|    Material | AISI 316 SS. |
| Core vessel: | |
|    Design pressure | 200 p.s.i. |
|    Design temp | 1200° F. |
|    I.D. | 3.85 ft. |
|    Height | 5.0 ft. |
|    Material | AISI 316 SS. |
| Reactor core volume | 32.6 ft.$^3$. |
| Reactor blanket, radial thickness | 1.5 ft. |
| Core cooling system: | |
|    Flow | 17,000 g.p.m. |
|    Total pressure drop, $\Delta$ | 70 p.s.i. |
|    Total pumping power | 2,000 H.P. |
| Blanket cooling system: | |
|    Total pressure drop | 45 p.s.i. |
|    Total average flow velocity | 2.09 ft./sec. |
| Heat transfer: | |
|    Inlet temperature | 550° F. |
|    Outlet temperature | 1200° F. |
|    Coolant flow rate | 1.42×10$^7$ lb. hr. |
|    Average flow velocity | 1.84 ft./sec. |
| $k_{eff}$ | 1.01. |

*Table 1*—Continued

| | |
|---|---|
| $U^{238}/Pu^{239}$ ratio | 7.34. |
| Fuel loading (kg. $Pu^{239}$) | 812. |
| Partial breeding ratio (core) | 0.7612. |
| Partial breeding ratio (radial blanket) | 0.5387. |
| Partial breeding ratio (axial blanket) | 0.1912. |
| Total breeding ratio | 1.4911. |
| Median fission energy, kev | 346. |
| Average capture to fission ratio in $Pu^{239}$ | 0.2309. |
| Radial maximum to average power generation rate | 1.19. |
| Axial maximum to average power generation rate | 1.41. |
| Average fast flux in core, neutrons/cm.$^2$-sec | $4.9 \times 10^{-15}$. |
| Core breeding ratio (average) | 0.7098. |
| Core breeding ratio (after 24 months) | 0.6639. |
| $\Delta k_{eff}$/month (initial) | —0.00458. |
| $\Delta k_{eff}$/month (average) | —0.00512. |
| $\Delta k_{eff}$/month (after 24 months) | —0.00566. |
| $Pu^{239}$ added/month (initial), kg | 7.85. |
| $Pu^{239}$ added/month (average), kg | 8.96. |
| $Pu^{239}$ added/month (after 24 months), kg | 10.14. |
| Doubling time ($Pu^{239}$ only), years | 5.8. |
| Doubling time (Pu, all isotopes), years | 4.1. |
| Effective delayed neutron fraction | 0.00387. |
| Prompt neutron lifetime, sec | $22.4 \times 10^{-8}$. |
| Burnup—maximum at 24 months | 88,000 mw. d./m.t. |

In the normal operation of reactor 100, molten sodium flows down through conduit 106 through the fuel region and out conduit 108, thereby maintaining a settled bed. Similarly, liquid metal coolant flows downward in the blanket region from pipe 128 into the blanket region and out pipe 132. In order to fluidize the fuel and blanket particles, flow of the coolant is reversed, the sodium passing through the core passing up through perforated plate 110 and in the blanket region up through perforated plate 118, to redistribute the particles as previously described.

Regarding the fuel which can be used in the preferred embodiments of this invention described above, the specific information given appears in the table. However, it should be understood that various suitable materials are available. For example, $UO_2$ in the form of stainless steel clad pellets could be utilized, or the fuels described in connection with U.S. Patent Nos. 2,809,931 and 2,812,303, issued to Daniels, can be readily incorporated into a reactor as described herein.

In the embodiments described it is seen that a unique reactor construction has been provided to combine the advantages of fluidized and settled bed as well as liquid fuel reactor designs and at the same time to avoid some of the disadvantages associated with the different designs. While fast neutron reactors were described as preferred embodiments, it is apparent that a suitable moderator-coolant such as water could be substituted for the sodium to obtain thermalizations of the neutrons and hence a thermal reactor.

Hence, although preferred embodiments have been illustrated and described, it is understood that the scope of the invention is limited only by the appended claims.

We claim:

1. A downflow packed particulate bed nuclear fission reactor comprising a core vessel having therein a bed of particles containing fissionable material, an outer vessel for enclosing said core vessel forming an annular breeding chamber having therein a bed of particles containing fertile material, means for directing coolant flow through said beds of particles in directions to maintain said beds each in a settled state during normal operation of said reactor, and means during shut-down of said reactor for fluidizing said beds to permit replacement and redistribution of said particles, said directing means passing the coolant into said core vessel for radial flow through the latter, and said core vessel being provided with openings to permit the coolant to flow into said bed of fertile particles.

2. A downflow packed particulate bed nuclear fission reactor comprising a core vessel having a perforated outer wall, a vertically extending manifold passing through said vessel and forming therewithin an annular chamber, said manifold having perforations in the region enclosed within said vessel, a bed of particles containing fissionable material partially filling said annular chamber, means for supplying coolant under pressure into said manifold, said coolant flowing radially outwardly and successively through the perforations of said manifold, into and through said bed, and out of said vessel through the perforations in the outer wall thereof during normal operation of said reactor, and means for fluidizing said bed during shut-down of said reactor for redistributing said fuel particles.

3. A downflow packed particulate bed nuclear fission reactor comprising a core vessel having a perforated outer wall, a vertically extending manifold passing through said vessel and forming therewithin an annular chamber, said manifold having perforations in the region enclosed within said vessel, a bed of particles containing fissionable material partially filling said annular chamber, inlet conduit means into the bottom of said annular chamber, outlet conduit means extending out from the upper portion of said annular chamber, means for supplying coolant under pressure into said manifold, said coolant flowing radially outwardly and successively through the perforations of said manifold, into and through said bed, and out of said vessel through the perforations in the outer wall thereof during normal operation of said reactor, and means for fluidizing said bed during shut-down of said reactor for redistributing said fuel particles, the latter said means consisting of means to pump said coolant into said vessel through said inlet means, up through said bed, and out through said outlet means at sufficient velocity to support said bed of particles in an expanded, fluidized state with over-all circulation of said particles.

4. The reactor of claim 3 in which said manifold has some perforations above the level of said bed to insure downflow of coolant at the upper level of said bed to prevent fluidization during normal operation of said reactor.

5. The reactor of claim 4 having control rods disposed within said manifold for movement in and out of the region enclosed by said vessel to permit controlled operation of said reactor.

6. A downflow packed particulate bed fast nuclear fission breeder reactor comprising a pressure vessel, a core vessel with a side wall lined with perforations mounted within and spaced from said pressure vessel, a vertically extending manifold passing through both of said vessels forming an annular fuel chamber in said core vessel and forming along with said core vessel an annular blanket chamber in said pressure vessel, said manifold receiving coolant under pressure from outside of said pressure vessel, said manifold having perforations in its wall within said core vessel, a fuel bed of particles containing fissionable material partially filling said annular fuel chamber, a blanket bed of particles containing fertile material partially filling said annular blanket chamber, an exit manifold for said coolant extending out from said blanket annular chamber from a lower portion thereof, said coolant during normal operation of said reactor flowing successively radially through said manifold perforations, said bed of fuel particles, through said core vessel perforations, generally downwardly through said blanket particles, and out of said reactor through said exit manifold, and means during shut-down of said reactor for fluidizing said beds independently and selectively redistributing said particles therein.

7. A downflow packed bed fast nuclear fission breeder reactor comprising a pressure vessel, a core vessel with a side wall lined with perforations mounted within and spaced from said pressure vessel, a vertically extending manifold passing through both of said vessels forming an annular fuel chamber in said core vessel and forming along with said core vessel an annular blanket chamber in said pressure vessel, said manifold receiving coolant under pressure from outside of said pressure vessel, said manifold having perforations in its wall within said core vessel, a fuel bed of particles containing fissionable material partically filling said annular fuel chamber, a blanket bed of particles containing fertile material partially filling said annular blanket chamber, an exit manifold for said coolant extending out from said blanket annular chamber from the lower portion thereof, first inlet conduit means extending through said pressure vessel and the bottom of said core vessel into said annular fuel chamber, second inlet conduit means extending through the bottom of said pressure vessel into said annular blanket chamber, first and second outlet conduit means extending out of the upper portions of said annular fuel and blanket chambers, respectively, said coolant during normal operation of said reactor flowing successively radially through said manifold perforations, said bed of fuel particles, through said core vessel perforations, substantially downwardly through said blanket particles, and out of said reactor through said exit manifold, and means during shut-down of said reactor for pumping fluid up through said first and second inlet conduit means, said fuel and blanket beds, and said first and second outlet conduit means at sufficient velocities to fluidize said beds independently and selectively to redistribute said particles therein.

8. The reactor of claim 7 in which said vertically extending manifold is provided with some perforations within said core vessel above the level of said fuel particles and some openings above said core vessel and the level of said fertile particles to maintain coolant downflow at the upper levels of said particles to prevent fluidization during normal operation of said reactor.

References Cited in the file of this patent

UNITED STATES PATENTS

| | | |
|---|---|---|
| 2,812,303 | Daniels | Nov. 5, 1945 |
| 3,034,689 | Stoughton et al. | May 15, 1962 |
| 3,058,897 | Slack et al. | Oct. 16, 1962 |

OTHER REFERENCES

Schulten: German application 1,034,784, printed July 24, 1958 (Kl. 21g 21/10), 2 pages spec., 1 sheet drawing.